United States Patent [19]

Tsunefuji

[11] 4,183,646
[45] Jan. 15, 1980

[54] ELECTRICAL SHUTTER OF ELECTROMAGNETIC RELEASE TYPE FOR CAMERA

[75] Inventor: Katsuhiko Tsunefuji, Hachioji, Japan

[73] Assignee: Olympus Optical Co., Ltd., Tokyo, Japan

[21] Appl. No.: 934,480

[22] Filed: Aug. 17, 1978

[30] Foreign Application Priority Data

Nov. 15, 1977 [JP] Japan .......................... 52-153240[U]

[51] Int. Cl.² .......................... G03B 9/16; G03B 9/66; G03B 15/03; G03B 17/24
[52] U.S. Cl. ................................ 354/106; 354/129; 354/251; 354/265
[58] Field of Search ............... 354/250, 251, 261, 265, 354/264, 106, 129

[56] References Cited

U.S. PATENT DOCUMENTS 3,854,143  12/1974  Kitai et al. ..................... 354/265

Primary Examiner—Michael L. Gellner
Attorney, Agent, or Firm—Lerner, David, Littenberg & Samuel

[57] ABSTRACT

An electrical shutter includes a locating member which maintains a shutter drive member at rest at its start position and which is constrained in abutment against the drive member in conjunction with a charging member, which rotates in response to a film winding operation, as a prime mover spring is being charged, thus holding the drive member against inadvertent movement. The locating member also urges a detent member against an electromagnet which is operative to control the closing operation of a shutter. The electrical shutter also includes switches which are associated with a data entry unit and a strobo unit and which are closed in response to an opening operation of the shutter.

8 Claims, 13 Drawing Figures

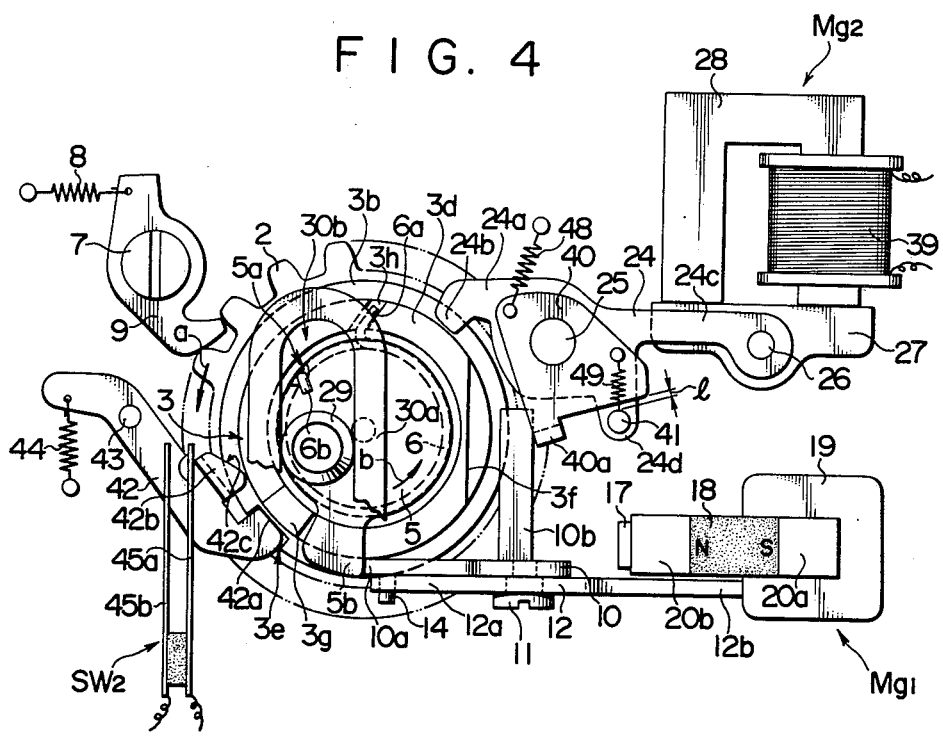
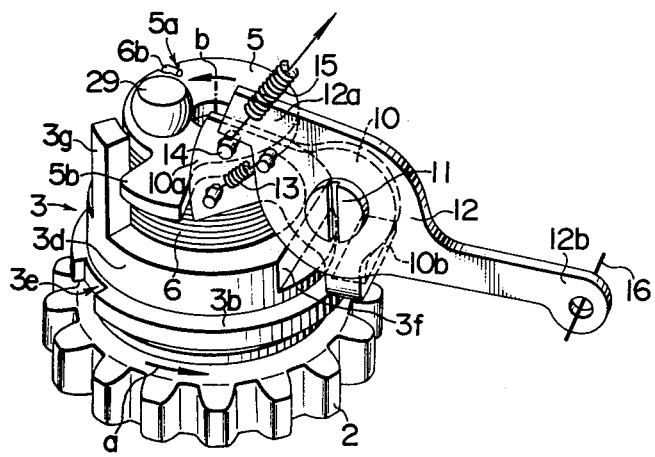
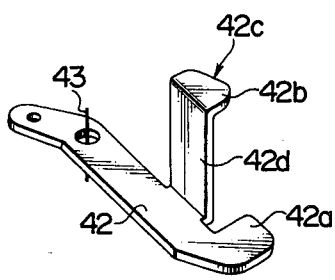

ELECTRICAL SHUTTER OF ELECTROMAGNETIC RELEASE TYPE FOR CAMERA

BACKGROUND OF THE INVENTION

The invention relates to an electrical shutter of electromagnetic release type for camera, and more particularly to such shutter in which one revolution of shutter drive member is effective to open and close the shutter blades.

An electrical shutter of electromagnetic release type is known which includes a prime mover spring disposed on a single shaft and which is charged in response to a film winding operation. It is effective, in response to an electromagnetic release, to drive a shutter drive member for rotation in order to operate the shutter blades. When the shutter is open, the rotation of the shutter drive member is controlled by a detent member which is constrained by an electromagnet, thereby achieving a desired exposure period. Such an electrical shutter is simple in construction and permits an automatic stop of a film winding operation for each picture frame. In addition, it prevents a double exposure by virtue of its inherent mechanism.

FIG. 1 shows a conventional arrangement of shutter mechanism of such single shaft rotating type. In this Figure, shutter drive member 101 is in the form of disc and is fixedly mounted on a single rotatable shaft 102, on which prime mover spring 103 is disposed having its one end 103a secured to drive member 101 and its other end 103b fixedly connected with charging member 109 which is adapted to rotate in response to a film winding operation. Thus spring 103 is charged through a film winding operation. The spring urges drive member 101 to rotate counter-clockwise, as indicated by an arrow. However, the resulting rotation of drive member 101 is blocked by the abutment of an arm 101a extending therefrom against bevelled edge 105a on locating member 105 which is pivotally mounted on pin 104, whereby drive member 101 is maintained at its start position to initiate a shutter operation.

Bevelled edge 105a is formed on the end of one arm of locating member 105, which includes another arm 105b which is adapted to be held attracted to release electromagnet Mg1. Normally, locating member 105 is urged to rotate clockwise about pin 104 by spring 110, whereby arm 105b is urged against electromagnet Mg1 while bevelled edge 105a bears against arm 101a to maintain shutter drive member 101 at its start position.

Detent member 106 has one arm 106a which is located on the path of rotation of arm 101a. Detent member 106 is pivotally mounted on pin 107 and is urged by spring 108 to rotate counter-clockwise about pin 107, whereby the end of the other arm of detent member 106 abuts against another electromagnet Mg2.

With the shutter mechanism described above, the depression of release button (not shown) activates an electrical shutter circuit to demagnetize electromagnet Mg1, whereupon locating member 105 is released from constraint thereof, allowing bevelled edge 105a to be raised by the arm 101a as the latter rotates counter-clockwise under the resilience of prime mover spring 103 in order to open shutter blades. In the fully open position of the shutter, arm 101a bears against arm 106a of detent member 106 to maintain the shutter fully open for a given period of time. At this time, electromagnet Mg2 holds detent member 106 attracted thereto. When a proper exposure has been achieved, electromagnet Mg2 is deenergized, whereupon drive member 101 rocks detent member 106 against the resilience of spring 108 to continue its rotation about shaft 102 through the remaining half-revolution to return to its start position, thus closing the shutter blades.

In the conventional arrangement of the single shaft rotating type described above, shutter drive member 101 is maintained at its start position by the abutment of its arm 101a against bevelled edge 105a on locating member 105. The purpose of this design is to prevent a starting lag in the shutter of electromagnetic release type, by allowing a rotation of drive member 101 to open shutter blades to occur immediately when electromagnet Mg1 is deenergized as a result of providing an abutting engagement between arm 101a and bevelled edge 105a. However, it will be appreciated that as spring 103 is charged in response to a film winding operation, the resilience stored therein which urges arm 101a against bevelled edge 105a progressively increases. This means that the retention of drive member 101 at its start position by means of locating member 105 may be unstable during the charging operation.

On the other hand, when a strobo unit and/or data entry unit is mounted on a camera incorporating an electrical shutter, a signal which actuates the unit is derived from an X contact switch provided on the part of camera. Referring to FIG. 2, an illumination initiate signal to strobo unit 50 or an entry initiate signal to data entry unit 51 is provided by X contact switch SW30 which is closed in the fully open position of the shutter. Strobo unit 50 includes a power source 52 across which main capacitor 53 and flash discharge tube 54 as well as a series circuit including resistor 55 and illumination test switch SW4 are connected in parallel. The switch SW4 is shunted by a series circuit including trigger capacitor 56 and trigger transformer 57. The X contact switch SW30 is connected in parallel with switch SW4. Consequently, when X contact switch SW30 is closed, the trigger circuit is driven to provide a strobo illumination in synchronized relationship with the fully open condition of the shutter, thereby permitting a flash photography. When it is desired to test strobo unit 50, test button (not shown) is depressed to close switch SW4 to see if the strobo unit 50 operating properly. It will also be noted that data entry unit 51 is also connected with switch SW30, the closure of which achieves a data entry.

However, when switch SW30 is connected in common with strobo and data entry units 50, 51 as shown, the closure of test switch SW4 not only initiates an illumination by strobo unit 50, but also achieves a data entry by unit 51. Therefore, if a picture is taken under flashlight illumination subsequent to such illumination test, data entry unit 51 will be operated for the second time to provide a double data entry, causing a blurring of data and an overexposure.

SUMMARY OF THE INVENTION

It is a principal object of the invention to provide an electrical shutter of electromagnetic release type for a camera which eliminates above disadvantages by an arrangement in which a locating member which maintains a shutter drive member at its start position is constrained, during the charging of a prime mover spring, in abutment against the drive member in conjunction with a charging member which rotates during a film winding operation.

It is another object of the invention to provide such electrical shutter in which a movement of locating member is utilized in a sophisticated manner to assure that the detent member be firmly held attracted to an electromagnet which controls the closing operation of the shutter.

It is a further object of the invention to provide such electrical shutter for camera with which a strobo unit and/or data entry unit may be used and wherein a double data entry is prevented by the provision of a switch which is closed when the shutter is opened.

It is still another object of the invention to provide such electrical shutter including an electrical shutter circuit which provides correction of a time lag involved with the attraction of locating member by a release electromagnet in a simple manner.

In accordance with the invention, a prime mover spring is charged in response to a film winding operation. The resilience urges an arm of a shutter drive member for movement, but the drive member is constrained by a locating member. An increase in the resilience of the spring does not result in an unintended movement of the locating member, thus assuring that the drive member be maintained at rest at its start position. When the locating member is constrained, a detent member which controls the closing operation of the shutter is driven against an associated electromagnet.

An actuating signal to strobo and data entry units is supplied through respective normally open switches formed by three movable resilient blades, eliminating a double data entry. Any error in the exposure period which results from a time lag in the operation of the release electromagnet can be simply removed by means of a correction resistor provided in the electrical shutter circuit.

BRIEF DESCRIPTION OF THE DRAWINGS

FIG. 4 is a plan view of the shutter shown in FIG. 3;

FIG. 5 is a fragmentary perspective view of the shutter shown in FIGS. 3 and 4;

FIG. 6 is a perspective view of the hook used in the shutter of FIGS. 3 and 4;

DESCRIPTION OF PREFERRED EMBODIMENTS

Figure 3:
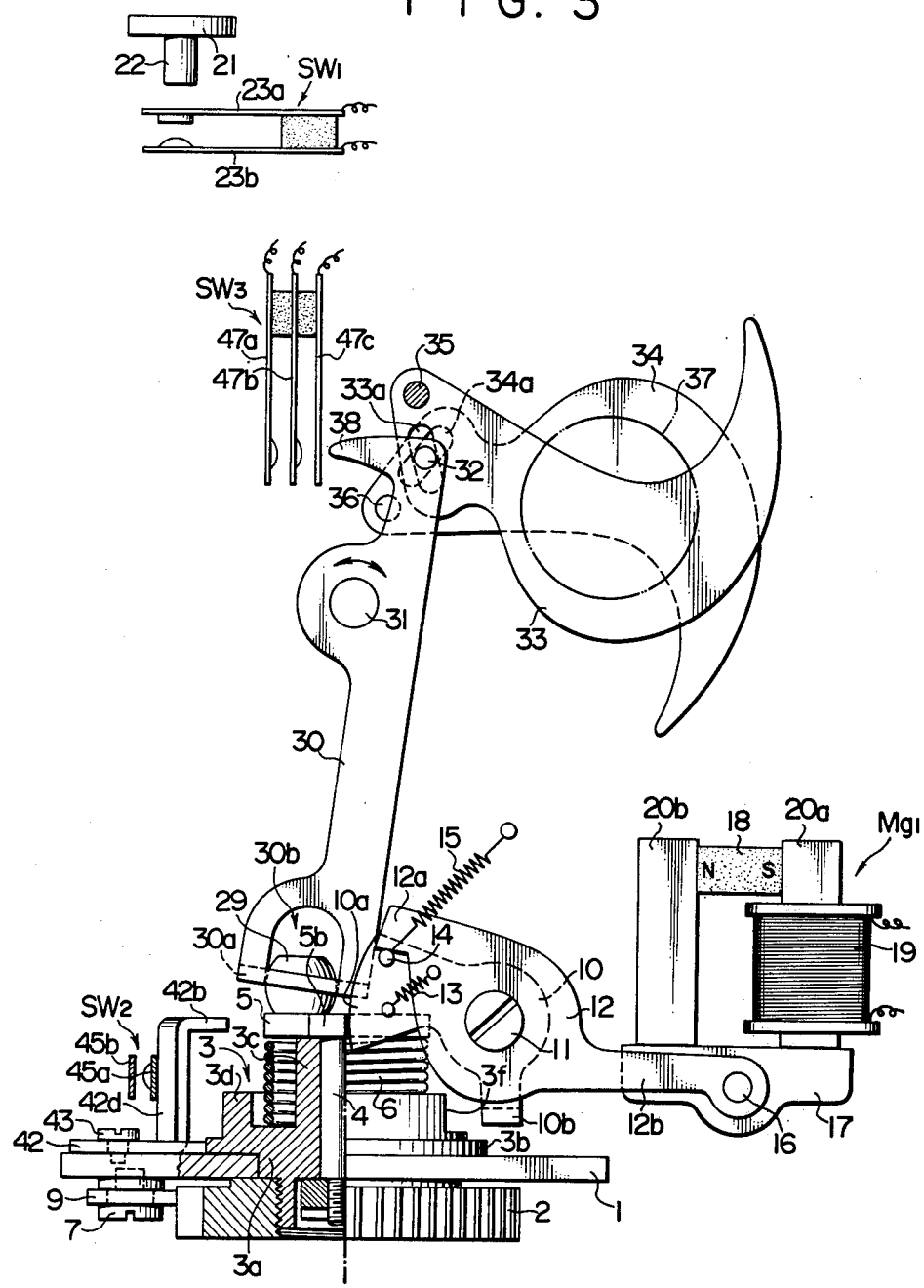
FIG. 3 is a front view of an electrical shutter of electromagnetic release type constructed according to one embodiment of the invention.

Referring to FIG. 3, there is shown baseplate 1, and charging member 3 is rotatably disposed therein and integrally carries gear 2 on its lower end. Charging member 3 comprises base portion 3a extending through the baseplate 1, disc 3b integral with base portion 3a and disposed on top of baseplate 1, and inner and outer sleeves 3c, 3d which are integral with the disc and forming a double sleeve. Outer sleeve 3d is formed on disc 3b and has a reduced height, while inner sleeve 3c comprises a hollow shaft of a greater height and extending centrally through charging member 3. Shaft 4 is rotatably received within inner sleeve 3c and fixedly carries a disc-shaped shutter drive member 5 on top thereof. Prime mover spring 6 is disposed around inner sleeve 3c, and has lower end 6a (see FIG. 4) which engages notch 3h formed in outer sleeve 3d and has upper end 6b (see FIG. 4) which engages in notch 5a (see FIG. 4) formed in the periphery of drive member 5, thus operatively connecting charging member 3 and shutter drive member 5 together.

Gear 2 is operatively connected with a film winding mechanism of known form, not shown, and is adapted to rotate in the direction of arrow a shown in FIG. 4 in response to a film winding operation. Gear 2 is engaged by ratchet pawl 9 which is mounted on stud 7 and urged by coiled spring 8 to engage gear 2, thus preventing its rotation in a direction opposite from that indicated by arrow a.

Shutter drive member 5 is peripherally formed with projecting arm 5b, which bears against detent arm 10a formed on one arm of locating member 10. As shown in FIGS. 3 to 5, locating member 10 is pivotally mounted on stud 11, on which detent member 12 in the form of a lever is also pivotally mounted at a position forwardly of locating member 10, as viewed in FIGS. 3 and 5. Detent arm 10a extends toward and engages arm 5b on the shutter drive member 5. The free end of detent arm is fan-shaped so as to abut against one lateral edge of arm 5b along a line of contact. Detent member 12 includes arm 12a which extends in overlapping relationship with the upper region of the free end of the detent arm 10a and is connected with the latter through tension spring 13. In this manner, detent member 12 and locating member 10 constitute together a double lever which normally operates in an integral manner.

Locating member 10 has a disc-shaped portion where it is pivotally mounted, and includes another arm 10 10b which is formed as a downwardly depending piece having a rearwardly extending folded portion located adjacent to outer sleeve 3d. Outer sleeve 3d is peripherally formed with cut-away 3f in the vicinity of the folded portion of arm 10b. In this manner, locating member 10 is capable of clockwise rotation about stud 11 until arm 10b bears against cut-away 3f. When rotated clockwise in this manner, the opposite arm 10a is completely retracted out of the path of rotation of arm 5b (see FIG. 7).

Pin 14 is fixedly mounted on arm 10a and is engaged by separation spring 15 which operates to rotate detent member 12 and locating member 10 clockwise about the stud 11 when electromagnet Mg1 is demagnetized. Pin 14 also serves as a stop against which arm 12a abuts, thus exactly defining the relative position between members 10, 12.

Detent member 12 includes another arm 12b which extends in the opposite direction from arm 12a and carrying pin 16 thereon which mounts armature piece 17 which is adapted to be held attracted to an electromagnetic release magnet Mg1. Armature piece 17 is normally held attracted to the mating surface of electromagnet Mg1 to cause detent member 12 to rotate counter-clockwise about stud 11 to bear against pin 14, thus tensioning spring 15 while causing locating member 10 to rotate counter-clockwise about stud 11 and maintaining it in a position in which detent arm 10a bears against arm 5b.

Electromagnet Mg1 comprises a release electromagnet which comprises a combination of permanent magnet 18 and an electromagnet. Specifically, permanent magnet 18 is held between a pair of yokes 20a, 20b, and solenoid coil 19 is disposed on yoke 20a. Normally, permanent magnet 18 is effective to hold armature piece 17 attracted thereto, thus constraining it. However, when coil 19 is energized in a direction to demagnetize permanent magnet 18, armature piece 17 is freed from constraint. The energizing current may be a current pulse.

As shown in FIG. 4, also extending into the path of rotation of arm 5b is controller 24b formed on one arm 24a of detent member 24 which is in the form of a lever pivotally mounted on pin 25 secured to 1 basplate. The detent member 24 is operative to determine an exposure period by engagement with arm 5b when shutter blades 33, 34 (see FIG. 3), to be described later, are fully open. Detent member 24 includes another arm 24c which extends in the opposite direction from arm 24a and which is provided with armature 27 mounted thereon by means of pin 26, the armature piece 27 being adapted to be held attracted by an electromagnet Mg2. Electromagnet Mg2 comprises channel-shaped yoke 28 and exciting coil 39, and holds armature piece 27 attracted thereto when coil 39 is energized, but frees it when deenergized.

Fixedly mounted on the upper surface of detent member 24 is pivot 25 which pivotally mounts engagement control member 40 which is operatively connected through tension spring 49 with pin 41 that is fixedly mounted on branch arm 24d extending from arm 24c, whereby members 24, 40 together form together a double lever. Arm 40a depends downwardly from a lateral edge of control member 40 which is adjacent to detent member 12 and is engageable with and disengageable from arm 10b. When locating member 10 is in a position to lock arm 5b, depending arm 40a is urged by the other arm 10b of locating member 10 to cause a counter-clockwise rotation of control member 40 about pivot 25 against the resilience of spring 49 and thus causes a counter-clockwise rotation of detent member 24 about pivot 25 through spring 49 and pin 41, thus urging armature piece 27 against the mating surface of electromagnet Mg2. Engagement control member 40 is engaged by a tension, separation spring 48, which urges control member 40 to rotate clockwise about pivot 25. Spring 48 is effective to cause a clockwise rotation of control member 40 about pivot 25 to drive pin 41 to thereby cause a clockwise rotation of detent member 24 about the same pivot 25 to move armature piece 27 away from the mating surface of electromagnet Mg2 when the latter is deenergized at the termination of an exposure period under the condition that shutter drive member 5 has rotated clockwise to a position where arm 5b abuts against controller 24b or in the fully open condition of shutter blades 33, 34.

An arrangement is made such that a gap of length l is produced between control member 40 and pin 41 under the condition that control member 40 has rotated counter-clockwise to bring armature piece 27 into abutment against the electromagnet Mg2 as a result of the drive transmitted by arm 10b to the depending arm 40a. The purpose of the gap is to assure that armature piece 27 be held attracted by electromagnet Mg2. If coil 39 is energized under this condition, the electromagnet Mg2 is immediately excited to hold armature piece 27 attracted thereto in a positive manner.

On the other hand, detent post 3g is formed on the upper end face of outer sleeve 3d adjacent to arm 5b for abutment therewith when the latter has rotated counter-clockwise through an amount slightly less than one revolution. Detent post 3g is integral with and extends uprightly from outer sleeve 3d. Disc 3b is formed with notch 3e at a position corresponding to detent post 3g for engagement by film locking hook 42. Hook 42 is pivotally mounted on stationary pin 43, and is urged to rotate counter-clockwise about pin 43, by coiled tension spring 44 which engages the outer end thereof. As shown in FIG. 6, hook 42 is L-shaped and has a hook end 42a which extends toward notch 3e for engagement therewith. Intermediate its length, hook 42 is provided with upright piece 42d which extends from that edge thereof which is located nearer disc 3b, with the free end of upright piece 42d being bent to provide release arm 42b which extends into the path of rotation of arm 5b. In the region located within the path of rotation of arm 5b, release arm 42b is formed with bevelled edge 42c which extends nearer the drive member 5, as viewed in the direction of rotation of arm 5b. In this manner, arm 5b can drive bevelled edge 42c to rotate hook 42 clockwise about pivot 43, thus moving hook end 42a out of notch 3e. However, hook 42 is normally urged to rotate counter-clockwise by spring 44 to have hook end 42a engaged with notch 3e to prevent the rotation of charging member 3 and thus lock the film. Under this condition, bevelled edge 42c is located on the path of rotation of arm 5b.

As shown in FIGS. 3 and 4, a normally open disconnection switch SW2 comprising resilient blades 45a, 45b is disposed adjacent to, but outwardly of upright piece 42d. The purpose of switch SW2 is to interrupt the electrical connection of electrical shutter circuit, to be described later, with a power source upon termination of a film winding operation. This switch is closed by upright piece 42d when hook 42 rotates clockwise about pivot 43 and is opened at the termination of a film winding operation when hook 42 rotates counter-clockwise about pivot 43 to have its hook end 42a engaged with notch 3e.

As shown in FIG. 3, shutter release member 21 is disposed over charging member 3. Release member 21 operates to close release switch SW1 with its switch actuator 22 which is secured to the lower surface thereof when a shutter button (not shown) is depressed. Switch SW1 comprises a normally open switch formed by resilient blades 23a, 23b.

Drive pin 29 is fixedly mounted on the upper surface of shutter drive member 5 at lower, left-hand position, as viewed in FIG. 4, and fits into elongated opening 30b formed by a horizontal, U-shaped portion 30a which is formed at the lower end of connecting rod 30, shown in FIG. 3. In FIG. 4, only the lower portion of connecting rod 30 is illustrated.

As shown in FIG. 3, connecting rod 30 is pivotally mounted on stud 31 and fixedly carries pin 32 on its upper end which fits into elongated slots 33a, 34a formed in one end of both shutter blades 33, 34, respectively. The shutter blades 33, 34 are pivotally mounted on pins 35, 36, respectively, and close a photographing optical path 37 in their position shown in FIG. 3. These shutter blades 33, 34 form together a so-called vario type shutter, which opens or closes optical path 37 in accordance with the oscillating motion of connecting rod 30 about stud 31 as shutter drive member 5 rotates under the resilience of prime mover spring 5, the movement of drive member 5 being transmitted through drive pin 29.

Figure 7:
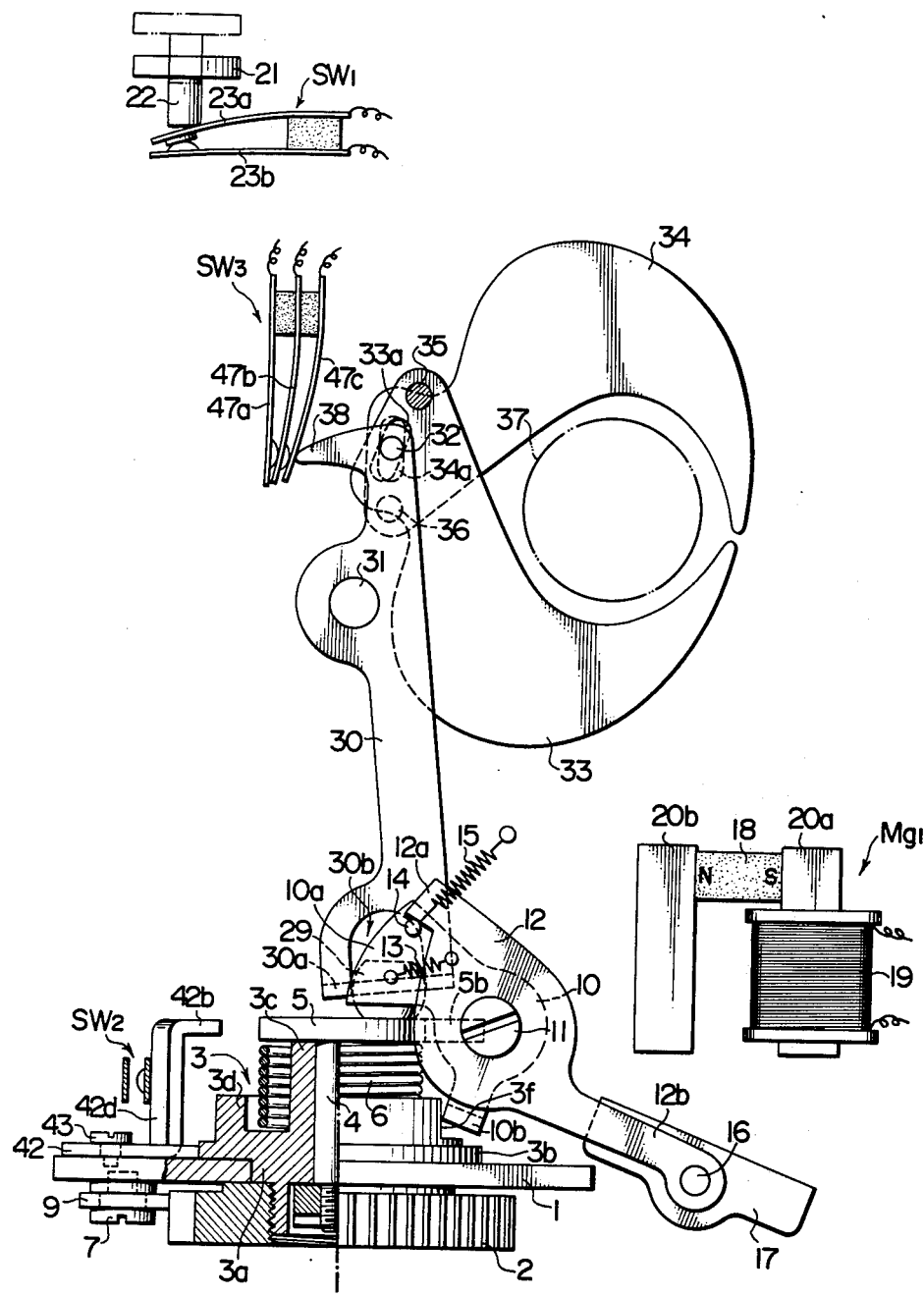
FIG. 7 is a front view of the shutter shown in FIG. 3 in its operative position.

The upper free end of connecting rod 30 is formed with switch actuator 38 which extends outwardly or to the left, as viewed in FIG. 3. X contact switch SW3 comprising three resilient blades 47a, 47b, 47c which constitute normally open switches are disposed adjacent to switch actuator 38. As illustrated in FIG. 7, switch SW3 is closed by actuator 38 when connecting rod 30 oscillates counterclockwise about pivot 31 to maintain shutter blades 33, 34 in their fully open position. Three blades 47a to 47c are used to constitute switch SW3 in order to prevent a double data entry which might occur upon depressing a test switch associated with strobo unit where both a strobo unit and a data entry unit are used in combination with the camera in which the shutter of the invention is incorporated.

Figure 11:
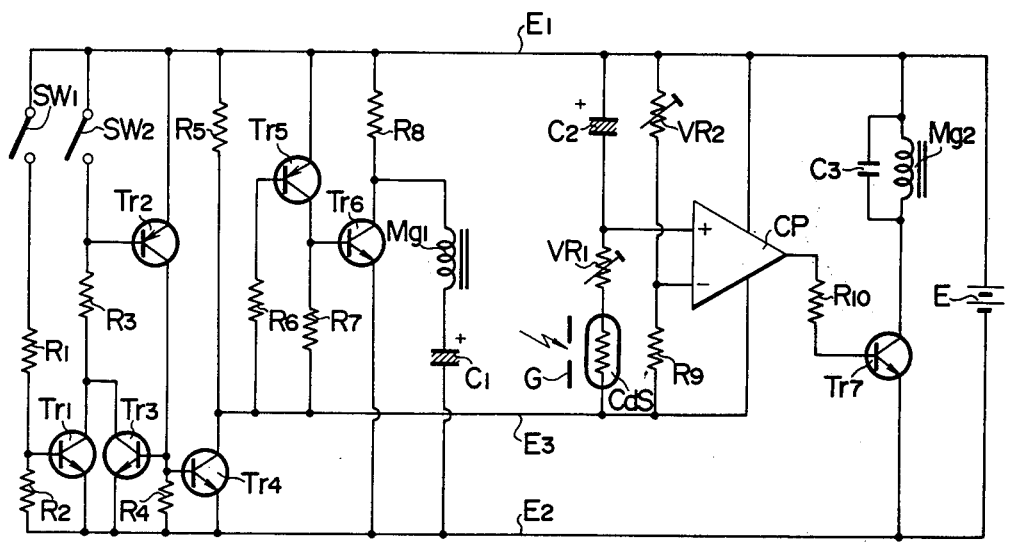
FIG. 11 is a circuit diagram of an electrical shutter circuit of the invention.

Referring to FIG. 11, there is shown an electrical shutter circuit which automatically controls the operation of the shutter mechanism described above. As shown, a pair of busses E1, E2 are connected with the positive and the negative terminal of a power source E. A series circuit including release switch SW1, and resistors R1, R2 is connected across these busses as is a series circuit including disconnection switch SW2, resistor R3 and starting transistor Tr1. Also connected across these busses are a series circuit including connection transistor Tr2 and resistor R4, another series circuit including resistor R5 and trigger transistor Tr4, and a further series circuit including electromagnet Mg2 and switching transistor Tr7. Also a series circuit including resistor R8, electromagnet Mg1 and capacitor C1 is connected across the busses.

Transistor Tr1 has its base connected with the junction between resistors R1, R2, its emitter connected with bus E2 and its collector connected with resistor R3. Transistor Tr2 has its base connected with the junction between resistor R3 and switch SW2, its emitter connected with bus E1 and its collector connected with resistor R4. Transistor Tr1 is shunted by connection transistor Tr3. Specifically, transistor Tr3 has its collector connected with the collector of transistor Tr1, its emitter connected with bus E2 and its base connected with the collector of transistor Tr2.

Transistor Tr4 has its base connected with the collector of transistor Tr2, its emitter connected with bus E2 and its collector connected with resistor R5, thus supplying an operating voltage to bus E3 which is connected with the collector thereof. Connected across busses E1, E3 are a photometric control circuit which constitutes the heart of the electrical shutter circuit, as well as a drive circuit associated with electromagnet Mg1. Consequently, transistor Tr4 operates in effect as a power switch and also as a trigger switch for the photometric control circuit.

The drive circuit associated with electromagnet Mg1 comprises a series circuit connected across busses E1, E3 and including transistor Tr5 and resistor R7, and transistor Tr6 which is connected in shunt with the series combination of electromagnet Mg1 and capacitor C1. Transistor Tr5 has its base connected with bus E3 through resistor R6, its emitter connected with bus E1 and its collector connected with bus E3 through resistor R7. Transistor Tr6 has its base connected with the collector of transistor Tr5, its emitter connected with bus E2 and its collector connected with bus E1 through resistor R8. Capacitor C1 is normally charged from the source E through resistor R8 and electromagnet Mg1, and when transistors Tr5, Tr6 are turned on in response to the conduction of transistor Tr4, the charge on capacitor C1 is rapidly discharged through electromagnet Mg1 to energize it, thus demagnetizing it.

The photometric control circuit is comprised of a time constant circuit including a series combination of capacitor C2, variable resistor VR1 and photometric, light receiving element CdS; a voltage divider formed by a series combination of variable resistor VR2 and resistor R9; and comparator CP, all of which are connected across busses E1, E3. The purpose of variable resistor VR1 is to provide an electrical compensation for the delay in the operation of electromagnet Mg1 which is formed by a release electromagnet, as will be further discussed later. The junction between variable resistor VR1 and time constant capacitor C2 is connected with one input of comparator CP. Element CdS receives light reflected by an object being photographed through diaphragm G, and exhibits a resistance which varies in accordance with the brightness of the reflected light. The resistance of variable resistor VR1 in combination with the resistance of element CdS determine a resistance value of the time constant circuit. Variable resistor VR2 serves as the means for adjusting the auto level of comparator CP. The junction between resistors VR2 and R9 is connected with the other input of comparator CP. In this manner, the potential at which comparator CP inverts is determined by an adjustment of the resistance of variable resistor VR2. At the same time as transistor Tr4 is turned on, comparator CP supplies its output voltage through resistor R10 to be applied to switching transistor Tr7, which is then turned on. When a charge of a given magnitude is accumulated on the capacitor C2, the output of comparator CP inverts, interrupting the application of its output voltage to transistor Tr7 to permit transistor Tr7 to be turned off. It will be noted that capacitor C3 is connected across electromagnet Mg2 to counteract the back e.m.f.

The operation of the electrical shutter will now be described. FIGS. 3 and 4 show the shutter in its charged condition after a film winding operation has been completed. Prime mover spring 6 is charged, urging shutter drive member 5 to rotate counter-clockwise. However, since detent member 12 which is constrained by shutter release electromagnet Mg1 maintains locating member 10 in the path of the rotation of arm 5b, the latter arm 5b abuts against detent arm 10a, whereby drive member 5 is maintained at rest at its start position.

When it is desired to take a picture under this condition, a shutter button (not shown) may be depressed. Thereupon, shutter release member 21 moves down, closing release switch Sw1. In response thereto, and referring to the electrical circuit shown in FIG. 11, transistor Tr1 is turned on, whereby transistor Tr2 is turned on as are transistors Tr3, Tr4. If the shutter button is then released to permit an upward movement of the release member 21 to open switch SW1 to thereby turn transistor Tr1 off, transistor Tr3 is maintained conductive, so that transistors Tr2, Tr4 remain on, maintaining the connection with the power source.

When transistor Tr4 conducts, bus E3 supplies an operating voltage. Hence, transistors Tr5, Tr6 are immediately turned on, and an output voltage of comparator CP is applied to transistor Tr7 to turn it on, thereby energizing electromagnet 22. When transistor Tr6 is turned on, the charge which has been accumulated on capacitor C1 through a current flow through resistor R8 discharges through electromagnet Mg1 in a pulse-like manner, thus demagnetizing it.

Figure 8:
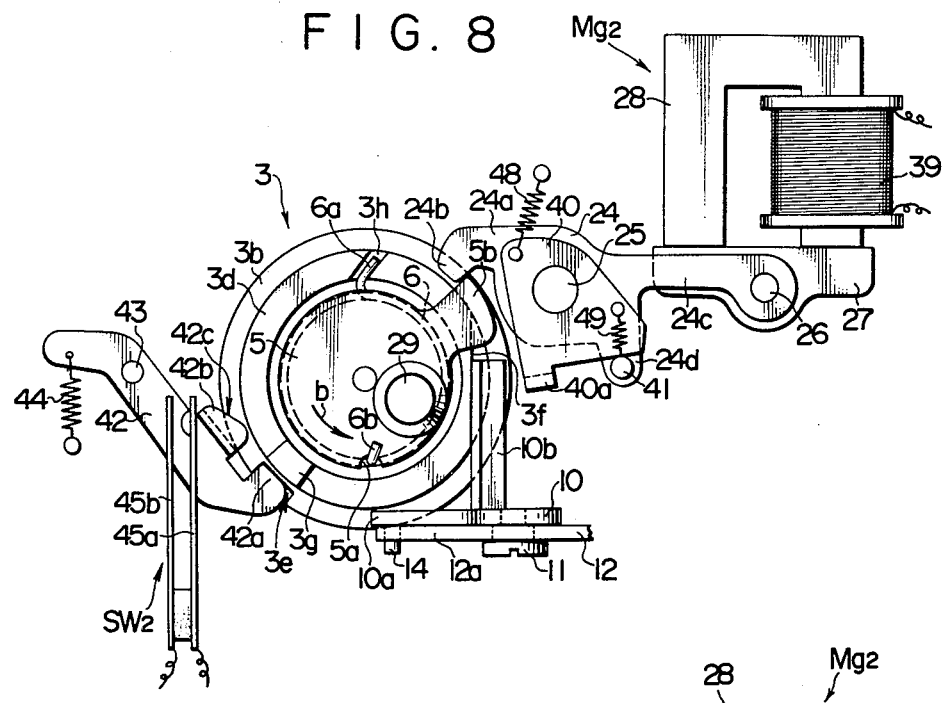
FIGS. 8, 9 and 10 are plan views illustrating the operative positions of the shutter shown in FIG. 4.

Thereupon, armature piece 17 which has been constrained by electromagnet Mg1 is freed, allowing locating member 10 and detent member 12 to rotate clockwise about stud 11 under the resilience of separation spring 15 to thereby disengage detent arm 10a from arm 5b. Then shutter drive member 5 can start under the resilience of prime mover spring 6. The rotation of members 10, 12 in the clockwise direction is stopped when arm 10b bears against the cut-away 3f of charging member 3, as shown in FIGS. 7 and 8. When locating member 10 rotates in this manner, its arm 10b moves away from depending arm 40a, and therefore control member 40 tends to rotate about pin 25 under the resilience of spring 48. However, since armature piece 27 is strongly held attracted to the energized electromagnet Mg2, only a slight rotation of control member 40 is permitted until its front edge bears against pin 41, eliminating the gap l.

After shutter drive member 5 is released and rotates in the direction of arrow b from its position shown in FIG. 4 to its position shown in FIG. 8, its integral drive pin 29 angularly moves connecting rod 30 from its position shown in FIG. 3 to its position shown in FIG. 7, thus causing shutter blades 33, 34 to be gradually opened in accordance with the angular displacement of connecting rod 30. The photographing optical path 37 is completely open as shown in FIG. 7 when arm 5b assumes a position (see FIG. 8) in which it is locked by controller 24b.

On the other hand, the photometric circuit begins to operate at the same time as demagnetizing current flows through electromagnet Mg1 from capacitor C1. The circuit operates to integrate the amount of reflected light from an object being photographed, by the time constant circuit comprising capacitor C2, element CdS and resistor VR1, and the integrated value is applied to comparator CP. It will be seen that the time constant circuit has a time constant of $C2' \times (R_{CdS} + R_{VR1'})$ where $C2'$ represents the capacitance of capacitor C2, $R_{CdS}$ a resistance which the element exhibits under the photographing condition, and $R_{VR1'}$ the resistance of variable resistor VR1. It will be understood that the time interval required to charge capacitor C2 represents a proper exposure period for the object being photographed. When the potential supplied to the input of comparator CP during the charging of capacitor C2 reaches a value which is equal to the potential at the junction between resistors VR2, R9, comparator CP is operated to deenergize the shutter controlling electromagnet Mg2 in order to close the shutter. Electromagnet Mg2 is immediately energized when transistor Tr7 is turned on, and holds armature piece 27 attracted thereto, thus constraining detent member 24. However, when it is deenergized, the constraint is removed, whereby detent member 24 rotates clockwise about stud 25 under the resilience of separation spring 48 because its controller 24b is urged by arm 5b as shown in FIG. 8, thus retracting controller 24b out of the path of rotation of arm 5b. When shutter drive member 5 has rotated counter-clockwise from the position shown in FIG. 8 to the position shown in FIG. 9, arm 5b abuts against the lateral side of detent post 3g extending upwardly from the outer sleeve 3d of charging member 3, thus ceasing to rotate. Shutter blades 33, 34 begin to close as shutter drive member 5 rotates from the position of FIG. 8, and the optical path 37 is completely closed when drive member 5 reaches its stop position.

Where an object being photographed is under very bright illumination to result in the energization of control electromagnet Mg2 which occurs only during a very brief period or which scarcely occurs, the resilience of separation spring 48 acting through engagement control member 40 causes detent member 24 to rotate clockwise about stud 25 to move its controller 24b out of the path of rotation of arm 5b before the latter arm reaches it, so that the arm 5b continues to rotate without abutment against controller 24b. This prevents a reduction in the speed of rotation of shutter drive member and allows it to complete its rotation uninterrupted through substantially one revolution, thus enabling a high speed shutter operation.

Figure 9:
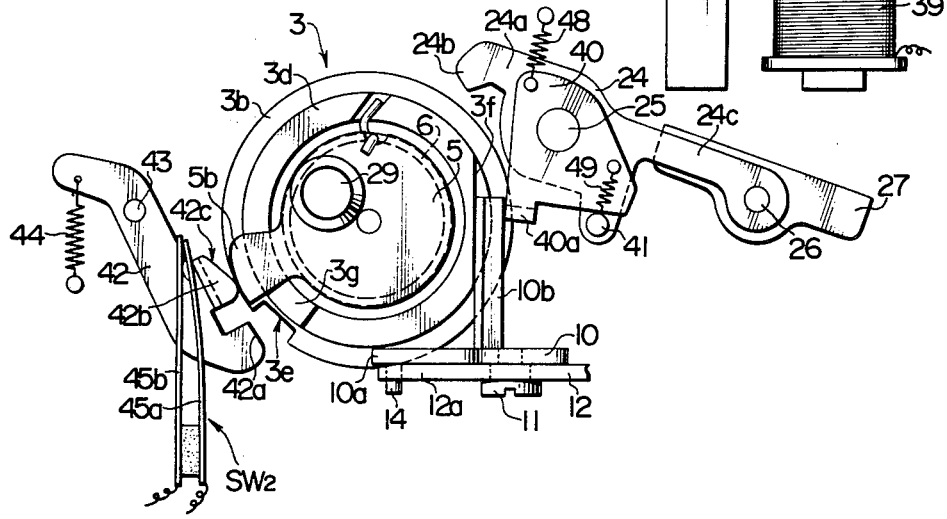

Arm 5b expels the bevelled edge 42c of hook 42 immediately before it abuts against the lateral side of the detent post 3g, so that hook 42 rotates clockwise about pin 43 as shown in FIG. 9, thus moving hook end 42a out of engagement with notch 3e. In this manner, a film winding operation is enabled. The rotation of hook 42 permits disconnection switch SW2 to be closed with its upstanding piece 42d.

In response to the closure of switch SW2, transistor Tr2 is turned off in the electrical circuit of FIG. 11, thus turning transistors Tr3, Tr4 off and interrupting the connection with the power source. At this time, the only current flowing through the circuit is the dark current of transistors which is insignificant. When transistor Tr4 is turned off, transistors Tr5, Tr6 are also turned off, permitting capacitor C1 to be charged through resistor R8 and electromagnet Mg1 in preparation for the next photographing operation. Upon completion of the charging of capacitor C1, there is no significant current flow through the entire circuit.

Figure 10:
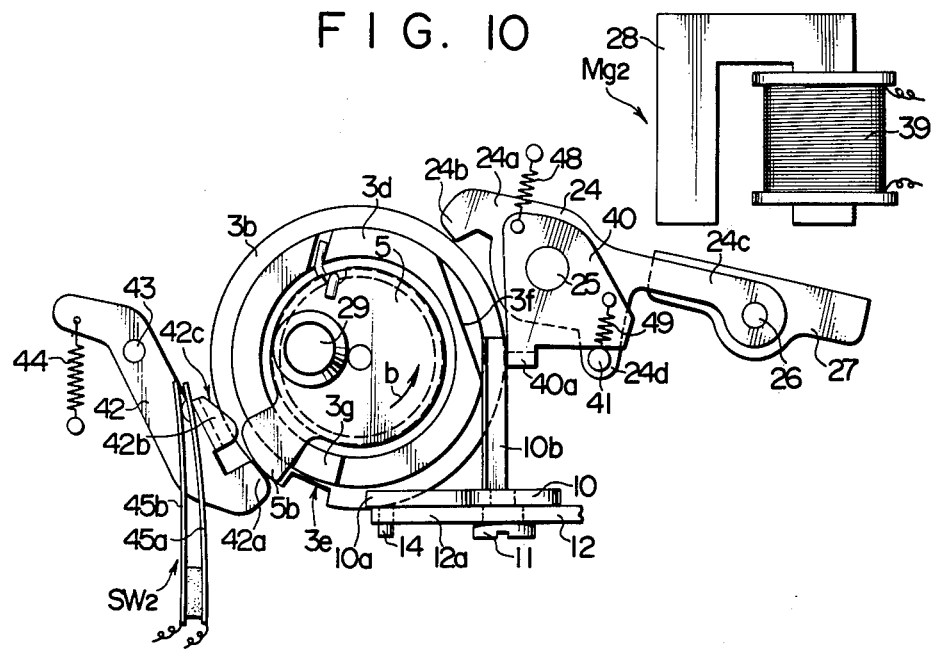

When a film winding operation takes place after a picture has been taken in the automatic exposure mode with the described electrical shutter, spring 6 is charged. Specifically, the film winding operation causes gear 2 to rotate together with its integral charging member 3, and notch 3h angularly drives the lower end 6a of spring 6. During the initial phase of the charging operation, shutter drive member 5 also rotates in the direction of arrow b, shown in FIG. 10, under the resilience of spring 6 until arm 5b bears against detent arm 10a. However, in the electrical shutter of the invention, an arrangement is made such that detent arm 10a is positively held in abutment against arm 5b in conjunction with the rotation of charging member 3. Specifically, as charging member 3 begins to rotate, arm 10b which has been in abutment against cut-away 3f (see FIG. 10) is driven along the outer periphery surface of outer sleeve 3d, whereby locating member 10 and detent member 12 rotate counter-clockwise about pin 11 under the resilience of associated spring 13, moving detent arm 10a into the path of rotation of arm 5b and causing armature piece 17 to be held attracted by electromagnet Mg1. In this manner, locating member 10 is constrained to a position in which detent arm 10a is located on the path of rotation of arm 5b during the rotation of charging member 3 or during the time prime mover spring 6 is being charged. This positively maintains shutter drive member 5 at its start position in which its arm 5b abuts against detent arm 10a. It will be seen that this avoids the possibility that shutter drive member 5 may be inadvertently displaced from its start position as spring 6 is being charged.

After arm 5b abuts against detent arm 10a to maintain drive member 5 at its start position, only gear 2 continues to rotate to charge spring 6. When charging member 3 rotates through one revolution until notch 3e formed in its disc 3b is located opposite to hook end 42a, hook 42 rotates counter-clockwise about stud 43 under the force of bias spring 44, causing hook end 42a to be engaged with notch 3e to provide a film locking and interrupting the rotation of charging member 3. Under this condition, cut-away 3f is located opposite to arm 10b as shown in FIG. 4, permitting a rotation of locating member 10.

When locating member 10 rotates counter-clockwise about pin 11 in the manner mentioned above, its arm 10b expels depending arm 40a, whereby control member 40 rotates counter-clockwise about pin 25 against the resilience of spring 48. This causes detent member 24 to rotate counter-clockwise about pin 25, urging armature piece 27 against the mating surface of electromagnet Mg2. This is additionally assured by the fact that after armature piece 27 is urged against electromagnet Mg2, arm 10b causes control member 40 to rotate through an additional stroke while tensioning springs 49, 48 until gap l is formed.

In the course of charging of spring 6 in response to a film winding operation, hook 42 bears against the peripheral surface of disc 3b, so that switch SW2 remains on. As a consequence, if the shutter button is depressed to close release switch SW1 during such interval, transistor Tr2 cannot be turned on. Since transistor Tr4 remains off, electromagnets Mg1 and Mg2 are ineffective, thus preventing an inadvertent operation of the shutter. At the termination of a film winding operation, the various members return to their initial positions shown in FIGS. 3 and 4 in preparation for the next photographing operation.

Figure 12:
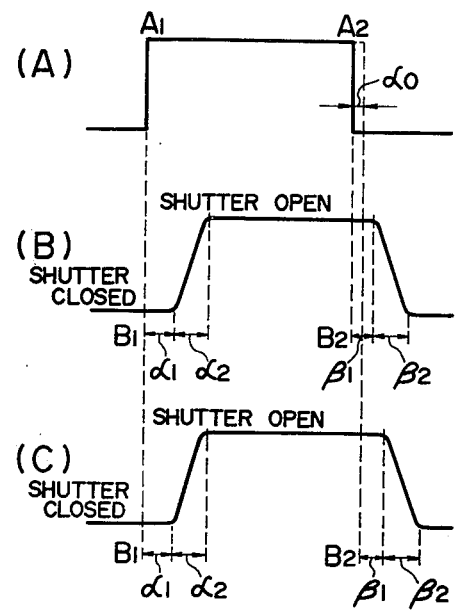
FIGS. 12A, B and C graphically illustrate the operating responses of the time constant circuit and the shutter opening and closing operation of the shutter.

In an electrical shutter of the type in which the open shutter condition is maintained by the use of an electromagnet, a time lag in the operation of such electromagnet (corresponding to electromagnet Mg2 used in the present invention) presents a problem during a high speed shutter operation. Attempts have been made in the prior art to eliminate such a time lag by activating the time constant circuit earlier than the beginning of operation of the shutter. However, there results an increase in the cost or difficulty in the adjustment thereof. Also, in an electrical shutter of the electromagnetic release type such as the one to which the invention is directed, where electromagnet Mg1 is used to initiate the shutter opening and electromagnet Mg2 is used to maintain the shutter open, it will be understood that there are time lags associated with the electrical and mechanical operations of the both electromagnets. Referring to FIG. 12 where the graph A represents the electrical response of the time constant circuit and the graph B represents the actual operation of the shutter, it will be seen that if it is assumed that release electromagnet Mg1 is activated at time B1 concurrently with time A1 when the time constant circuit begins to operate, there is a time lag $\alpha 1$ which occurs as a result of the back e.m.f. produced in electromagnet Mg1, and which is added with another time lag $\alpha 2$ which occurs due to the mechanical operation of locating member 10 and detent member 12. Thus the shutter reaches its fully open condition after $(\alpha 1 + \alpha 2)$ after the time A1. Similarly, when the time constant circuit terminates its operation at time A2, there are also time lag $\beta 1$ due to the back e.m.f. produced upon deenergization of electromagnet Mg2 and another time lag $\beta 2$ which is due to the mechanical operation of control member 40 and detent member 24. Thus, the shutter becomes closed after a delay time of $(\beta 1 + \beta 2)$ after time A2.

It will be seen that if the magnitude of time lag $\alpha 1$ associated with electromagnet Mg1 can be made equal to time lag $\beta 1$ associated with electromagnet Mg2 and if time lags $\alpha 2$, $\beta 2$ due to mechanical operation are equal to each other, the sum of time delay $(\alpha 1 + \alpha 2)$ at the initiation of shutter operation is equal to the sum of time delay $(\beta 1 + \beta 2)$ at the end of shutter operation, assuring a proper exposure of film if the time constant circuit is actuated simultaneously with the energization of electromagnet Mg1. However, a time lag involved with the mechanical operation of electromagnets and levers varies in both positive and negative directions, and cannot be adjusted to a uniform value.

In an arrangement where a release electromagnet (Mg1) is used to open the shutter and a conventional electromagnet (Mg2) is used to close the shutter as in the electrical shutter of the invention, the time lag associated with the electrical operation of electromagnet Mg1 is normally greater than the time lag associated with the electrical operation of electromagnet Mg2. This is because the coil of the electromagnet is energized to reduce the attraction by the permanent magnet, and the demagnetizing effect is somewhat reduced by the back e.m.f. induced across the coil. This, combined with the fact that usual electromagnet Mg2 operates faster than release electromagnet Mg1, results in a closing operation of the shutter which occurs more rapidly than the opening operation thereof. In other words, an exposure period will be less than the magnitude of a proper exposure which is determined by the time constant circuit. To eliminate the described inconvenience, a time delay associated with the electrical operation of release magnet is utilized in accordance with the invention to delay the timing at which the usual electromagnet which controls the shutter closing operation is energized, by a modification of the time constant circuit, in order to assure a proper exposure. Specifically, since $\alpha 1 - \beta 1 > 0$, the difference $\alpha 0 = \alpha 1 - \beta 1$ is introduced into the time constant circuit to provide a correction therefor. A resistor which provides this correction is shown as variable resistor VR1 in FIG. 11. The addition of variable resistor VR1 permits the energization of electromagnet Mg2 to be delayed by a time length $\alpha 0$ so that the shutter operation takes place as shown by the graph C in FIG. 12. In this manner, the time interval determined by the time constant circuit is in substantial coincidence with the actual exposure period of the film. Thus, a proper exposure can be assured by adjusting the time lags $\alpha 2$ and $\beta 2$, which occur due to the mechanical operation, to be comparable.

Figure 1:
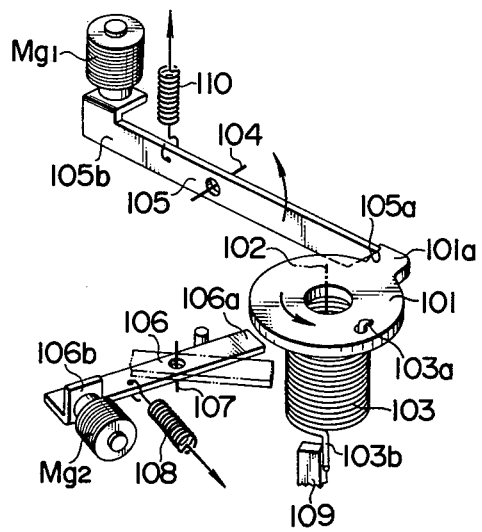
FIG. 1 is a perspective view of a rotary drive mechanism used in a conventional electrical shutter of electromagnetic release type.
Figure 2:
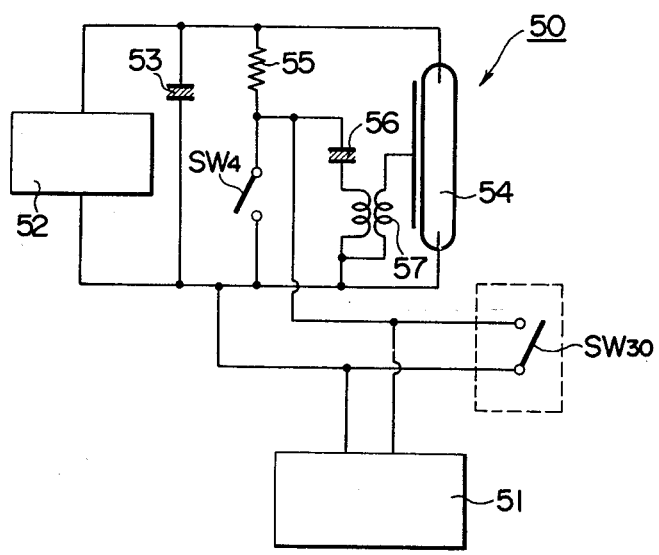
FIG. 2 is a circuit diagram illustrating the electrical connection between X contact switch and a strobo unit and a data entry unit.
Figure 13:
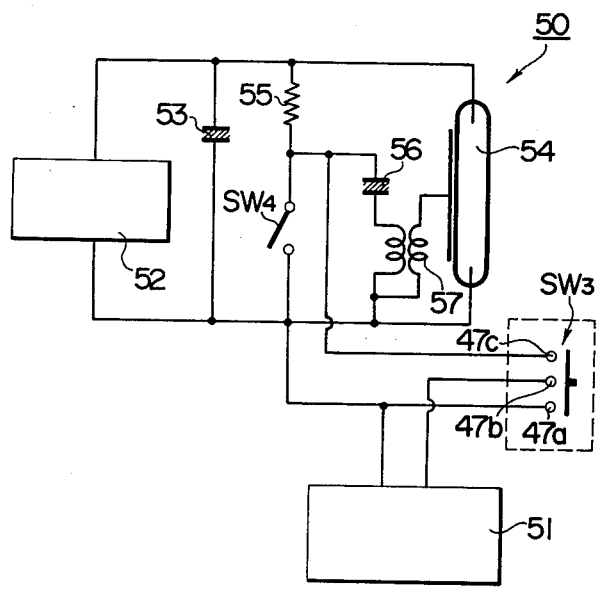
FIG. 13 is a circuit diagram illustrating the electrical connection between synchro switch and strobo and data entry units according to the invention.

Additionally, in the electrical shutter of the invention, X contact switch SW3 comprises three resilient blades 47a, 47b, 47c (see FIGS. 3 and 7) to form a two-pole normally open switch. Contacts 47a to 47c are connected with strobo unit 50 and data entry unit 51 as shown in FIG. 13. Specifically, contacts 47c and 47b are connected in shunt with illumination test switch SW4 of strobo unit 50 while contacts 47b and 47a are connected with data entry unit 51. This prevents data entry unit 51 from being actuated if test switch SW4 is closed since contacts 47c, 47b are maintained clear from each other. On the other hand, when the shutter is fully open, X contact switch SW3 is closed, bringing all of the contacts 47a to 47c into engagement with each other, thus simultaneously operating strobo unit 50 and data entry unit 51. In this manner, a double data entry which occured in the prior arrangement is completely eliminated. This result can be achieved without any significant change in the space and cost requirement since it is only necessary to add one movable blade to conventional switch SW30 (see FIG. 2).

What is claimed is:

1. An electrical shutter of the electromagnetic release type for a camera comprising shutter blades, a charging member adapted to rotate about a single shaft in response to a film winding operation to charge a prime mover spring which is used to drive the shutter, a shutter drive member responsive to an electromagnetic release by rotating through substantially one revolution under the resilience of the prime mover spring to open and close said shutter blades, a locating member for maintaining the shutter drive member at rest at its start position before the shutter is operated, detent means cooperating with the charging member to constrain the locating member during the time the prime mover spring is being charged to maintain the shutter drive member in engagement with the locating member, an electrical shutter circuit including a first shutter release electromagnet and a second electromagnet controlling the shutter closing operation for automatically controlling a period of time during which shutter blades are maintained in their open position as a result of rotation of the shutter drive member.

2. An electrical shutter according to claim 1 in which the charging member comprises a short sleeve having a peripheral surface which causes the locating member to rotate during the time the prime mover spring is being charged, the detent means causing a detent arm of the locating member to abut against a mating arm of the shutter drive member, thus maintaining the shutter drive member at rest.

3. An electrical shutter according to claim 1 in which the charging member comprises a double sleeve including an inner sleeve formed by a hollow shaft and an outer, short sleeve, and fixedly carries a gear on its lower end which rotates in response to a film winding operation, the prime mover spring being disposed around the inner sleeve, the outer sleeve being peripherally formed with a cut-away which permits a rotation of the locating member in a direction away from the shutter drive member.

4. An electrical shutter according to claim 1 in which the shutter drive member comprises a disc which is adapted to rotate under the resilience of the prime mover spring and which is formed with a radially extending arm and a drive pin formed on its upper surface adjacent to the periphery, the rotation of the disc causing the drive pin to oscillate a connecting rod to open or close the shutter blades.

5. An electrical shutter according to claim 1 in which the locating member is in the form of a lever having a first, fan-shaped detent arm engageable with and disengageable from the arm of the drive member and a second arm formed by a depending piece which is located adjacent to the outer sleeve of the charging member, the lever being mounted to be operationally integral with the detent member, the oscillation of which is controlled by the shutter release magnet, the detent member being responsive to the interruption of attraction of the detent member by the magnet by rotating its second arm into the region of the cut-away formed in the outer sleeve of the charging member, thus releasing the detent arm from abutment against the arm of the drive member to permit a rotation of the shutter drive member.

6. An electrical shutter according to claim 1 in which the locating member includes means operative to displace a second detent member to its operative position when the locating member has moved into engagement with the shutter drive member.

7. An electrical shutter according to claim 6 in which the detent second member has a controller on the end of its first arm which is movable into and out of the path of rotation of the arm of the shutter drive member and has an armature piece on the end of its second arm which is adapted to be held attracted by the control electromagnet, the second detent member being connected through a spring with an engagement control member so as to be integral operationally therewith, the second detent member rotating as the engagement control member is driven by the second arm of the locating member to move the controller into the path of rotation of the arm of the drive member and to move the armature piece into abutment against the control electromagnet.

8. An electrical shutter of the electromagnetic release type for a camera comprising shutter blades, a charging member adapted to rotate about a single shaft in response to a film winding operation to charge a prime mover spring which is used to drive the shutter, a shutter drive member responsive to an electromagnetic release by rotating through substantially one revolution under the resilience of the prime mover spring to open and close said shutter blades, a locating member for maintaining the shutter drive member at rest at its start position before the shutter is operated, detent means cooperating with the charging member to constrain the locating member during the time the prime mover spring is being charged to maintain the shutter drive member in engagement with the locating member, an electrical shutter circuit including a first shutter release electromagnet and a second electromagnet controlling the shutter closing operation for automatically controlling a period of time during which shutter blades are maintained in their open position as a result of rotation of the shutter drive member; first and second normally-open switches which are respectively associated with a data entry unit and a strobo unit; means responsive to said shutter drive member for closing said first and second normally-open switches when said shutter blades are in a fully open position.

* * * * *

UNITED STATES PATENT AND TRADEMARK OFFICE
CERTIFICATE OF CORRECTION

PATENT NO. : 4,183,646
DATED : January 15, 1980
INVENTOR(S) : Katsuhiko Tsunefuji It is certified that error appears in the above—identified patent and that said Letters Patent is hereby corrected as shown below:

Column 2, line 45, before "operating", insert --is--.

Column 4, line 40, after "arm", insert --10--.

Column 5, line 27, change "1 basplate" to --baseplate 1--.

Column 5, line 45, delete "together", second occurrence.

Column 6, line 3; column 9, line 35; and column 11, line 38; at each occurrence, change "1" to --1--.

Column 7, line 63, change "thereof" to --of Tr4--.

Signed and Sealed this

Fifth Day of May 1981

[SEAL]

Attest:

RENE D. TEGTMEYER

Attesting Officer     Acting Commissioner of Patents and Trademarks